US009042832B2

(12) United States Patent
Gu

(10) Patent No.: US 9,042,832 B2
(45) Date of Patent: May 26, 2015

(54) COMMUNICATIONS METHOD AND MOBILE COMMUNICATION TERMINAL

(75) Inventor: Xianjin Gu, Huizhou (CN)

(73) Assignee: HUIZHOU TCL MOBILE COMMUNICATION CO., LTD, Huizhou, Guangdong (CN)

(*) Notice: Subject to any disclaimer, the term of this patent is extended or adjusted under 35 U.S.C. 154(b) by 163 days.

(21) Appl. No.: 13/505,982

(22) PCT Filed: May 18, 2011

(86) PCT No.: PCT/CN2011/074209
§ 371 (c)(1),
(2), (4) Date: May 3, 2012

(87) PCT Pub. No.: WO2012/016466
PCT Pub. Date: Feb. 9, 2012

(65) Prior Publication Data
US 2012/0225623 A1  Sep. 6, 2012

(30) Foreign Application Priority Data

Aug. 2, 2010  (CN) .......................... 2010 1 0250289

(51) Int. Cl.
*H04B 1/00* (2006.01)
*H04B 15/02* (2006.01)
*H04M 1/725* (2006.01)

(52) U.S. Cl.
CPC .............. *H04B 1/3838* (2013.01); *H04B 15/02* (2013.01); *H04M 1/72591* (2013.01)

(58) Field of Classification Search
CPC .. H04B 15/02; H04B 1/3838; H04M 1/72591
USPC ......... 455/63.1, 69, 550.1, 571, 575.4, 575.7; 381/312, 315
See application file for complete search history.

(56) References Cited

U.S. PATENT DOCUMENTS

| 6,321,068 | B1 * | 11/2001 | Zamat | 455/69 |
| 2004/0176125 | A1 * | 9/2004 | Lee | 455/522 |
| 2007/0009125 | A1 * | 1/2007 | Frerking et al. | 381/315 |
| 2007/0116308 | A1 * | 5/2007 | Zurek et al. | 381/312 |
| 2010/0279751 | A1 * | 11/2010 | Pourseyed et al. | 455/575.7 |
| 2011/0117973 | A1 * | 5/2011 | Asrani et al. | 455/571 |
| 2011/0201393 | A1 * | 8/2011 | Gautier et al. | 455/575.4 |
| 2011/0275406 | A1 * | 11/2011 | Yang et al. | 455/550.1 |

FOREIGN PATENT DOCUMENTS

| CN | 1881985 A | 12/2006 |
| CN | 101170759 A | 4/2008 |
| CN | 101562460 A | 10/2009 |
| CN | 101902239 A | 12/2010 |
| CN | 101958945 A | 1/2011 |
| CN | 101997946 A | 3/2011 |
| CN | 201781539 U | 3/2011 |
| CN | 201805459 U | 4/2011 |
| WO | 9731431 A1 | 8/1997 |
| WO | 2009086243 A1 | 7/2009 |

OTHER PUBLICATIONS

Office Action issued by SIPO, on Mar. 25, 2014, for CN application 201010250289.4, corresponding to the current U.S. Appl. No. 13/505,982.

* cited by examiner

*Primary Examiner* — Wesley Kim
*Assistant Examiner* — Raj Chakraborty
(74) *Attorney, Agent, or Firm* — Shimokaji & Associates P.C.

(57) ABSTRACT

The present invention relates to the communication field and describes a communication method and a mobile communication terminal. The communication method and the mobile communication terminal according to the present invention add new capabilities to mobile communication terminals, including cell phones, such that they can choose from a plurality of radio frequency parameter sets for communications. The present invention enables cell phones to store a plurality of radio frequency parameter sets, and necessary changes to RF parameters can be assessed according to different user demands or external application environments such that the cell phone software can switch to upload the most appropriate RF parameters. Consequently, an antenna can obtain optimal parameters such that a cell phone can obtain optimal radiation properties without the need to design a new antenna and can meet HAC requirements by operators.

18 Claims, 2 Drawing Sheets

COMMUNICATIONS METHOD AND MOBILE COMMUNICATION TERMINAL

FIELD OF THE INVENTION

The present invention relates to the field of communications and more particularly, to a communications method and mobile communication terminal.

DESCRIPTION OF THE RELATED ART

When a wireless communications device works at maximum power, it can result in serious electromagnetic interference to surrounding electronic products. In particular, the serious electromagnetic interference is felt by hearing aids used by disabled people, which can deteriorate their connection quality.

In light of this, the U.S. FCC (Federal Communications Commission) implemented a mandatory HAC (Hearing Aid Compatibility) certification program for cell phone manufacturers that restricts the interference of cell phone electromagnetic fields on hearing aids of people with a hearing handicap. The HAC reference standard is ANSI C63.19 (US National Standard Method to Measure Compatibility between Hearing Aids and Cellular Telephones). As defined by the standard, a consumer can determine the compatibility between certain hearing aids and cell phones according to the hearing aid's anti-interference level and corresponding signal emission level of the cell phone.

People are paying more and more attention to cell phones' HAC (restriction of the interference of a cell phone's electromagnetic field on hearing aids of people with hearing handicap) index. In order to meet this index, a new specific antenna would typically be designed for cell phones, which requires investment of additional R & D, increases labor cost, and makes it more difficult for logistic control.

Therefore, the prior art is in need of improvement and development.

SUMMARY OF THE INVENTION

The present invention provides a communications method and mobile communication terminal that overcome the above drawbacks of the prior art. The communications method and mobile communication terminal add capabilities to mobile communication terminals, including cell phones, such that they can choose from a plurality of radio frequency parameter sets for communications and that antenna parameters can be assessed according to different demands for subsequent selection of appropriate RF parameters. The present invention permits cell phones to meet the HAC (restriction of the interference of cell phone electromagnetic field on hearing aids of people with a hearing handicap) index without the need to design a new antenna, thereby saving manufacturing cost.

According to one aspect, the present invention provides a communications method comprising performing testing and calibration of a communication terminal to obtain at least two sets of radio frequency (RF) parameters corresponding to a normal radiation index and a second radiation index for an antenna; storing the at least two sets of RF parameters; calling one of the at least two sets of RF parameters corresponding to a certain radiation index for switching; and when the switching is successfully completed, configuring RF parameters corresponding to the certain radiation index to all transmission modules for communications.

More specifically, the second radiation index may restrict the interference of cell phone electromagnetic field on hearing aids of people with a hearing handicap.

In the case of a hearing aid user, the method may call one of the at least two sets of RF parameters corresponding to a hearing aid mode radiation index that restricts the interference of cell phone electromagnetic field on hearing aids of people with a hearing handicap for switching to a hearing aid mode.

When the switching is successfully completed, RF parameters may be configured to correspond to the hearing aid mode radiation index in all transmission modules for communications.

In the above method, the communication terminal may be a mobile phone.

In the above method, the transmission modules for communications include a baseband chip, a RF transceiver, a power amplifier, an antenna switch and the antenna.

According to another aspect of the present invention, a mobile communication terminal comprises a radio frequency (RF) parameter calibration and storage module adapted to obtain at least two sets of RF parameters corresponding to a normal radiation index and a second radiation index for an antenna, and further adapted to store the at least two sets of RF parameters; a calling module adapted to call one of the at least two sets of RF parameters corresponding to a certain radiation index for switching as needed; and a configuration module adapted to, when the switching is successfully completed, configure RF parameters corresponding to the certain radiation index to all transmission modules for communications.

The mobile communication terminal, which may be a mobile phone, may include mobile phone software adapted to perform the switching between the at least two sets of RF parameters.

According to a further aspect of the present invention, a method for transmitting a signal from a mobile phone comprises calling on a first one of at least two sets of radio frequency (RF) parameters that are stored in advance in a memory of the mobile phone to configure an RF transceiver, a power amplifier and an antenna switch module in a transmission path; passing signals through a baseband chip into the RF transceiver for processing; amplifying signals from the RF transceiver in the power amplifier; and radiating amplified signals from an antenna of the mobile phone.

The above method may include a second one of the at least two sets of RF parameters that restricts the interference of cell phone electromagnetic field on hearing aids of people with a hearing handicap.

The above method may permit a user to select one of the at least two sets of RF parameters.

The communications method and the mobile communication terminal according to the present invention add capabilities to mobile communication terminals, including cell phones, such that they can choose from a plurality of radio frequency parameter sets for communications. It changes the situation in the past where it was necessary to design a new specific antenna for cell phones as a result of HAC index requirements. To the contrary, cell phones just need to store a plurality of radio frequency parameter sets, and necessary changes to RF parameters can be assessed according to different user demands or external application environments such that the cell phone software can switch to upload the most appropriate RF parameters. Consequently, an antenna can obtain optimal parameters such that a cell phone can obtain optimal radiation properties without the need to design a new antenna and can meet HAC requirements by operators.

The present invention can optimize terminal radiation performance, greatly reduce development cost and development time of cell phone design, and save manufacturing cost.

A mobile communication terminal that comprises a RF parameter calibration and storage module for testing and calibration to obtain at least two sets of RF parameters corresponding to a normal radiation index and a second radiation index for the same antenna, and storing the at least two sets of RF parameters; a calling module for calling one of the at least two sets of RF parameters corresponding to a certain radiation index for switching as needed; a configuration module for, when the switching is successfully completed, configuring RF parameters corresponding to the certain radiation index to all transmission modules for communications.

The communications method and the mobile communication terminal according to the present invention add capabilities to mobile communication terminals, including cell phones, such that they can choose from a plurality of radio frequency parameter sets for communications. It changes the situation in the past where it was necessary to design a new specific antenna for cell phones as a result of HAC index requirements. To the contrary, cell phones just need to store a plurality of radio frequency parameter sets, and necessary changes to RF parameters can be assessed according to different user demands or external application environments such that the cell phone software can switch to upload the most appropriate RF parameters. Consequently, an antenna can obtain optimal parameters such that a cell phone can obtain optimal radiation properties without the need to design a new antenna and can meet HAC requirements by operators. The present invention can optimize terminal radiation performance, greatly reduce development cost and development time of cell phone design, and save manufacturing cost.

DETAILED DESCRIPTION OF A PREFERRED EMBODIMENT

The present invention provides a communications method and a mobile communication terminal. To make the object, technology and advantages of the present invention more clearly understood, the present invention is further described in detail below with reference to the accompanying drawings and an embodiment. It should be understood that the specific embodiment described herein is only intended to explain the present invention, not to limit the present invention.

Figure 1:
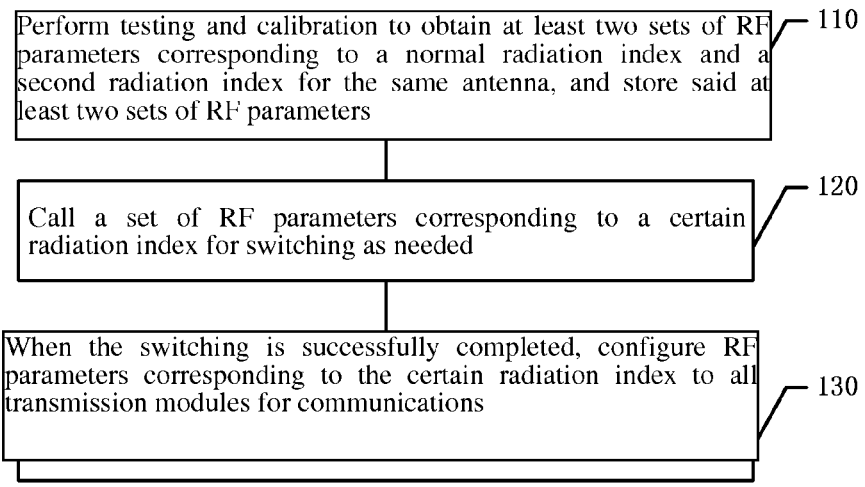
FIG. 1 is the flow chart of a communications method according to an embodiment of the present invention.

The communications method according to an embodiment of the present invention is used for mobile communication terminals, including cell phones, as shown in FIG. 1, the communications method comprising the following steps:

S110. Prior to the delivery of mobile communication terminals, including cell phones, performing testing and calibration to obtain at least two sets of RF parameters corresponding to a normal radiation index and a second radiation index for the same antenna, and storing the at least two sets of RF parameters;

S120. Calling a set of RF parameters corresponding to a certain radiation index for switching as needed;

S130. When the switching is successfully completed, configuring the called on set of RF parameters, corresponding to the certain radiation index, to all transmission modules for communications.

The communications method according to the present invention will be further described in detail below through a specific embodiment of a cell phone application.

Figure 2:
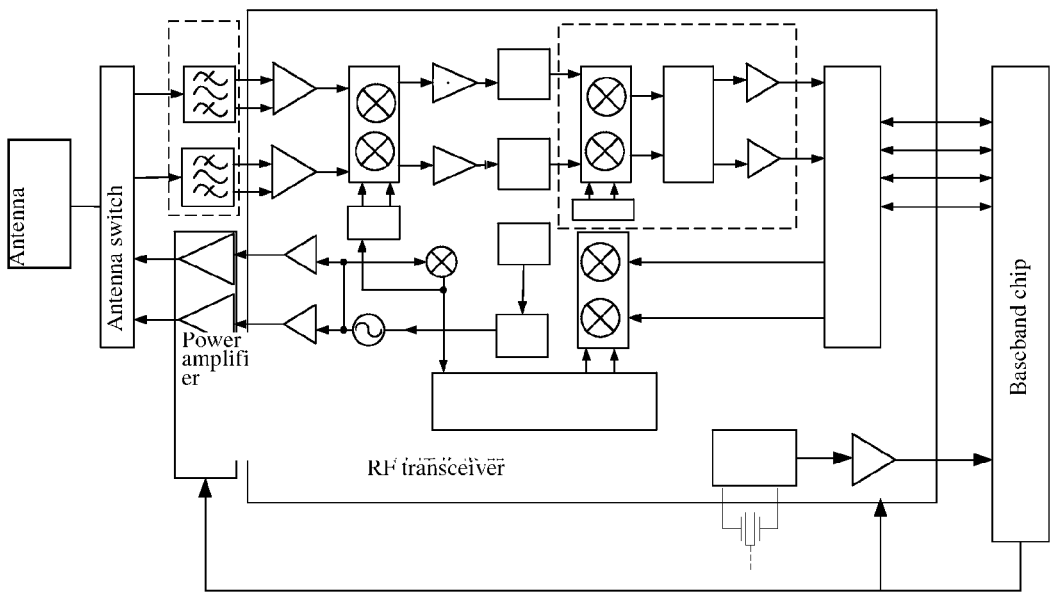
FIG. 2 is a block diagram of a cell phone's RF transmission structure.

As shown in FIG. 2, a block diagram of a GSM cell phone's typical RF transmission structure is shown. It can be seen from the figure that the transmission path includes a baseband chip, a RF transceiver, a power amplifier, an antenna switch and an antenna. The signal transmission process by the cell phone is as follows.

In a first step, the baseband chip calls RF parameters that are stored in advance in the cell phone's memory to make a correct and rational configuration of three modules (the RF transceiver, power amplifier, and antenna switch modules) in the transmission path. In a second step, desired signals pass through the baseband chip and enter the RF transceiver for processing. In a third step, signals that have been processed by the RF transceiver enter the power amplifier and are amplified to a proper power. In a fourth step, the power is radiated externally via the cell phone antenna. In order to meet mobile communications standards and to obtain optimal radiation and transmission performance, all RF components need to be configured with appropriate parameters. These steps complete the cell phone function of signal transmission.

In this process, the three modules in the transmission path are configured with the cell phone RF parameters which consequently play a decisive role in the ultimate radiation performance of the cell phone antenna.

There is typically one set of RF parameters in existing cell phone software, while the market has ever-changing requirements on cell phone radiation performance (e.g., requirements by the SAR index (parabolic index or stop and reverse operation point index), requirements by the HAC (restriction of the interference of cell phone electromagnetic field on hearing aids of people with a hearing handicap) index, etc.). If one identical set of RF parameters is used in all circumstances, i.e., all inputs to cell phone antennas are the same, then the cell phone antennas will have substantially identical radiation performance, which apparently is not able to meet various demands by the market for cell phone radiation performance.

Currently, there are mandatory HAC index requirements on cell phones by mobile terminal operators in North America. If the configuration of one set of RF parameters is to be maintained, a new specific antenna needs to designed for cell phones so as to meet the requirements of such index, which will greatly increase development cost and time for cell phones.

The communications method in the specific and applied embodiment of the present invention employs new software to switch internal RF parameter configurations and thereby simultaneously meet the cell phone's normal radiation index and the HAC radiation index using the same type of antenna.

The specific implementation steps are as follows.

Step 1. Prior to the delivery of a cell phone terminal, perform testing and calibration to obtain two sets of optimal RF parameters corresponding to a normal radiation index and a second radiation index for the same antenna. These performance parameters are stored in the cell phone's memory.

Step 2. Configure in the cell phone software such that the cell phone can easily switch between the two sets of parameters through the software and consequently, the baseband chip can smoothly call one set of RF parameters from the two sets of parameters.

Step 3. In practical applications, since the cell phone in the embodiment has stored two sets of optimal RF parameters corresponding to the normal radiation index and the second radiation index for the same antenna, it is capable of choosing from different RF parameters for communications. On the one hand, it can switch in advance to RF parameters that meet the HAC index, using the software according to the demand by cell phone operators. On the other hand, it can also configure corresponding options in the cell phone application software and let users choose, on their own, whether to switch to parameters that meet the HAC index.

Step 4. When the switching is successfully completed, the baseband chip correctly configures RF parameters that meet the HAC index to all modules prior to signal transmission by the cell phone.

In other words, a user can choose a normal instruction for communications during normal use, which is the normal mode.

In case of a hearing aid user, the user can call the set of RF parameters corresponding to the radiation index that restricts the interference of cell phone electromagnetic field on hearing aids of people with a hearing handicap and switch to the hearing aid mode.

When the switching is successfully completed, the present invention can configure RF parameters corresponding to the radiation index that restricts the interference of cell phone electromagnetic field on hearing aids of people with a hearing handicap to all transmission modules for communications.

The radiation performance of the cell phone in the present embodiment meets the HAC index requirements without the need to design a new specific antenna. As a result, the cell phone has the capability of choosing different RF parameters for communications according to different demands. This greatly reduces development cost and development time of cell phone design, and saves manufacturing cost.

Figure 3:
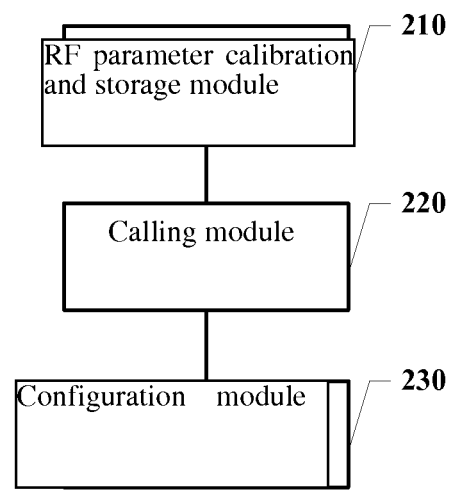
FIG. 3 is a block diagram of a mobile communication terminal according to an embodiment of the present invention.

Based on the above communications method, the embodiment of the present invention further provides a mobile communication terminal. As shown in FIG. 3, said mobile communication terminal comprises a RF parameter calibration and storage module 210 for testing and calibration to obtain at least two sets of RF parameters corresponding to a normal radiation index and a second radiation index for the same antenna, and storing the at least two sets of RF parameters. A calling module 220 can call a set of RF parameters corresponding to certain radiation index for switching as needed. A configuration module 230 can be used for, when the switching is successfully completed, configuring RF parameters corresponding to the certain radiation index to all transmission modules for communications.

The communications method and the mobile communication terminal according to the present invention add new capabilities to mobile communication terminals, including cell phones, such that they can choose from a plurality of radio frequency parameter sets for communications. It changes the situation in the past where it was necessary to design a new specific antenna for cell phones as a result of HAC index requirements. To the contrary, cell phones of the present invention just need to store a plurality of radio frequency parameter sets, and necessary changes to RF parameters can be assessed according to different user demands or external application environments such that the cell phone software can switch to upload the most appropriate RF parameters. Consequently, an antenna can obtain optimal parameters such that a cell phone can obtain optimal radiation properties with no need to design a new antenna and can meet HAC requirements by operators. The present invention can optimize terminal radiation performance, greatly reduce development cost and development time of cell phone design, and save manufacturing cost.

It should be understood that the present invention is not limited to the above embodiment. Those skilled in the art may make improvements or modifications according to the above description, while all these improvements and modifications shall be encompassed by the claims of the present invention.

What is claimed is:

1. A communications method, comprising:
performing testing and calibration of a communication terminal to obtain more than two sets of radio frequency (RF) parameters corresponding to a normal radiation index, a second radiation index, and a third radiation index for an antenna, wherein the normal radiation index causes a wireless communications device to produce electromagnetic interference that deteriorates hearing aid connection quality and wherein at least one of the second radiation index and the third radiation index restricts the wireless communications device from producing electromagnetic interference that deteriorates hearing aid connection quality below an acceptable hearing aid threshold level;
storing said more than two sets of RF parameters;
calling one of the said more than two sets of RF parameters corresponding to a selected radiation index for switching;
dynamically switching between the more than two sets of RF parameters without user input using a single circuit; and
selecting, by user input, an additional set of RF parameters from the more than two sets of RF parameters;
uploading the additional set of RF parameters selected by the user input;
when the switching is successfully completed, configuring RF parameters corresponding to the selected radiation index to a plurality of transmission modules for communications, wherein the plurality of transmission modules define a single circuit including a baseband chip, a RF transceiver and a power amplifier and wherein the normal radiation index, the second radiation index and the third radiation index are associated with the same antenna, and
wherein the baseband chip of the single circuit is configured using the additional set of RF parameters selected by the user to selectively produce the normal radiation index.

2. The communications method of claim 1, wherein said second radiation index restricts the interference of cell phone electromagnetic field on hearing aids of people with a hearing handicap.

3. The communications method of claim 2, including:
checking for a hearing aid user;
if the check reveals the hearing aid user, calling one of the more than two sets of RF parameters corresponding to a hearing aid mode radiation index that restricts the interference of cell phone electromagnetic field on hearing aids of people with hearing handicap for switching to a hearing aid mode.

4. The communications method of claim 3, including:
when the switching is successfully completed, configuring RF parameters corresponding to the hearing aid mode radiation index that restricts the interference of cell phone electromagnetic field on hearing aids of people with hearing handicap to all transmission modules for communications.

5. A mobile communication terminal, comprising:
a radio frequency (RF) parameter calibration and storage module configured to obtain more than two sets of RF parameters corresponding to a normal radiation index, a second radiation index, and a third radiation index for a single antenna, and configured to store said more than two sets of RF parameters,
wherein the more than two sets of RF parameters are configured for a single circuit and the single antenna and wherein the normal radiation index causes the mobile communication terminal to produce electromagnetic interference with surrounding electronic products and wherein at least one of the second radiation index and the third radiation index restricts the mobile communication terminal from producing interference with hearing aids;
a calling module configured to call an automatically selected set of the more than two sets of RF parameters corresponding to a radiation index for switching;
a decision module configured to decide, by user input, whether to accept the automatically selected set of the more than two sets of RF parameters;
a configuration module configured to selectively configure RF parameters, to cause the mobile phone to produce electromagnetic interference that deteriorates hearing aid connection quality below an acceptable hearing aid threshold level and based on the user input, to all transmission modules for communications when the switching is successfully completed, wherein the transmission modules include a baseband chip, a radio frequency (RF) transceiver and a power amplifier.

6. The communications method of claim 1, wherein the communication terminal is a mobile phone.

7. The communications method of claim 6, wherein the transmission modules for communications include a baseband chip, a RF transceiver, a power amplifier, an antenna switch and the antenna.

8. The mobile communication terminal of claim 5, wherein the mobile communication terminal is a mobile phone.

9. The mobile communication terminal of claim 8, wherein the transmission modules for communications include a baseband chip, a RF transceiver, a power amplifier, an antenna switch, and the antenna.

10. The mobile communication terminal of claim 8, including mobile phone software configured to perform the switching between the more than two sets of RF parameters.

11. A method for transmitting a signal from a mobile phone, the method comprising:
calling on a first one of more than two sets of radio frequency (RF) parameters that are stored in advance in a memory of the mobile phone to configure an RF transceiver, a power amplifier and an antenna switch module in a transmission path, wherein at least one of the more than two sets of radio frequency (RF) parameters causes the mobile phone to produce electromagnetic interference that deteriorates hearing aid connection quality and wherein at least one of the more than two sets of radio frequency (RF) parameters restricts the mobile phone from producing electromagnetic interference that deteriorates hearing aid connection quality;
passing signals through a baseband chip into the RF transceiver for processing;
selecting, by user input, manual or automatic selection of RF parameters;
selecting an additional set of RF parameters;
uploading the additional set of RF parameters;
dynamically switching between the more than two sets of RF parameters and the additional set of RF parameters to selectively configure the RF transceiver to cause the mobile phone to produce electromagnetic interference that deteriorates hearing aid connection quality below an acceptable hearing aid threshold level;
amplifying signals from the RF transceiver in the power amplifier; and
radiating amplified signals from an antenna of the mobile phone, wherein the single circuit and each of the more than two sets of radio frequency (RF) parameters are associated with the same antenna.

12. The method of claim 11, including permitting a user to select one of the more than two sets of RF parameters.

13. The method of claim 12, including setting one of the more than two sets of RF parameters to correspond to a hearing aid mode radiation index that restricts the interference of cell phone electromagnetic field on hearing aids of people with hearing handicap for switching to a hearing aid mode.

14. The method of claim 11, including programming mobile phone software to switch between the more than two sets of RF parameters.

15. The method of claim 11, including providing the ability to switch between the more than two sets of RF parameters without requiring a new antenna design.

16. The method of claim 11, wherein the selected one of the more than two sets of RF parameters corresponds to all transmission modules for communications for the mobile phone.

17. The method of claim 11, wherein the transmission modules for communications include a baseband chip, a RF transceiver, a power amplifier, an antenna switch, and the antenna.

18. The method of claim 17, including calling, by the baseband chip, of RF parameters that are stored in advance in the mobile phone's memory to make a correct and rational configuration of the RF transceiver, the power amplifier, and the antenna switch module in a transmission path.

* * * * *